US011075484B2

(12) United States Patent
Wu et al.

(10) Patent No.: US 11,075,484 B2
(45) Date of Patent: Jul. 27, 2021

(54) PROTECTION SHEATH STRUCTURE FOR SWITCH WIRE CONNECTION DEVICE

(71) Applicants: SWITCHLAB INC., New Taipei (TW); SWITCHLAB (SHANGHAI) CO., LTD., Shanghai (CN); GAOCHENG ELECTRONICS CO., LTD., Shenzhen (CN)

(72) Inventors: Chih-Yuan Wu, New Taipei (TW); Wen Bing Hsu, New Taipei (TW)

(73) Assignees: Switchlab Inc., New Taipei (TW); Switchlab (Shanghai) Co., Ltd., Shanghai (CN); Gaocheng Electronics Co., Ltd., Guangdong (CN)

( * ) Notice: Subject to any disclaimer, the term of this patent is extended or adjusted under 35 U.S.C. 154(b) by 9 days.

(21) Appl. No.: 16/601,798

(22) Filed: Oct. 15, 2019

(65) Prior Publication Data

US 2020/0127413 A1 Apr. 23, 2020

(30) Foreign Application Priority Data

Oct. 19, 2018 (TW) .................................. 107214243

(51) Int. Cl.
*H01R 13/56* (2006.01)
(52) U.S. Cl.
CPC .................. *H01R 13/562* (2013.01)
(58) Field of Classification Search
CPC .. H01R 13/5205; H01R 13/5213; B60R 25/04
See application file for complete search history.

(56) References Cited

U.S. PATENT DOCUMENTS

| 3,588,783 | A | * | 6/1971 | Newman | ............ | H01R 13/5025 439/598 |
| 3,905,672 | A | * | 9/1975 | Anhalt | ............... | H01R 13/5205 439/281 |
| 4,978,940 | A | * | 12/1990 | Kaplan | ................... | B60R 25/04 307/10.3 |
| 5,567,174 | A | * | 10/1996 | Ericson, Jr. | ........ | H01R 13/5205 439/462 |
| 8,764,480 | B2 | * | 7/2014 | Natoli | ................ | H01R 13/5213 439/523 |
| 9,306,315 | B2 | * | 4/2016 | Scholten | .............. | H02G 15/013 |

* cited by examiner

*Primary Examiner* — Jean F Duverne
(74) *Attorney, Agent, or Firm* — Rosenberg, Klein & Lee (57) ABSTRACT

A protection sheath structure for switch wire connection device provides dustproof and waterproof effects and enhances the assembling security between the switch wire connection device and the conductive wire. The protection sheath has the form of a cylindrical body including a head section having a mouth section, a belly section connected with the head section and a tail section connected with the belly section. The head section and the belly section together define a chamber for assembling with the switch wire connection device. The tail section defines a guide hole permitting the conductive wire to plug into the protection sheath. Multiple annular ribs are disposed on a circumference of the tail section to enhance the structural strength of the protection sheath (or the tail section), whereby the tail section is able to bear external force produced in wiring operation of the conductive wire.

42 Claims, 13 Drawing Sheets

PROTECTION SHEATH STRUCTURE FOR SWITCH WIRE CONNECTION DEVICE

BACKGROUND OF THE INVENTION

1. Field of the Invention

The present invention relates generally to a protection sheath structure for switch wire connection device, and more particularly to a protection sheath structure mounted on a switch wire connection device to enclose the wiring structure and tightly connect with the switch wire connection device.

2. Description of the Related Art

A conventional switch wire connection device is a power switch device capable of connecting circuits or conductive wires. The switch wire connection device is installed on a console or distribution box of an electronic or electrical apparatus for connecting the wiring circuits. The switch wire connection device employs a conductive component and a metal leaf spring (or screw) mounted on a wire connection seat or a contact seat (generally made of plastic material) to press the wiring circuits or conductive wires of the electronic or electrical apparatus. By means of operating a switch (pushbutton), the conductive component and the metal leaf spring are controlled to electrically contact or separate from the wiring circuits or the conductive wires so as to close the circuit to power on the electronic or electrical apparatus or open the circuit to power off the electronic or electrical apparatus.

In order to permit different diameters of conductive wires to plug into the switch wire connection device, the diameter of the wire plug-in hole of the switch wire connection device obviously must be larger than that of the conductive wire to facilitate the operation. With respect to the structural form and operation/application of the assembling structure of the conventional switch wire connection device, there are some shortcomings as follows:

1. The diameter of the wire plug-in hole is obviously larger than that of the conductive wire. In practice, after a long period of use, dust, water or moisture is apt to infiltrate and accumulate in the terminal to affect the electro-conductive performance.
2. The cooperative structure of the wire connection assembly and the case profile (or wire plug-in hole) of the conventional switch wire connection device is quite complicated. Therefore, the problem has existed for a long time in this field that the manufacturers can hardly manufacture an effective protection structure to seal the wire plug-in hole and prevent the dust, water or moisture from infiltrating into switch.

In some practical applications, in order to prevent the external rainwater or dust from infiltrating into the switch device, a case is additionally arranged to enclose the switch. However, as well known by those who are skilled in this field, the arrangement of the additional case obviously will lead to increase of the occupied room of the entire switch device. Also, due to the additional case, the operation and delivery become more troublesome and the cost is increased. This is not what we expect.

To speak representatively, the conventional switch wire connection device has some shortcomings in structure assembling design and application. To overcome the above shortcomings, it is necessary to redesign the structure assembling form of the switch wire connection device (or the case) and the wire plug-in hole. In this case, the structure and use form of the conventional switch wire connection device can be changed and the application range thereof can be substantially widened.

For example, in the condition that it is easy to operate and assemble the switch wire connection device, a protection sheath is provided to prevent the dust, water or moisture from infiltrating and accumulating in the switch wire connection device. Moreover, the additional case for enclosing the switch can be omitted. Therefore, the problems of the conventional switch wire connection device that the occupied room of the entire switch device is increased, the operation and delivery are more troublesome and the cost is increased can be eliminated.

Especially, the protection sheath must have a sufficient structural strength to bear the external pulling and bending force (or action force) applied to the switch wire connection device when an operator operates or wires the switch wire connection device. All these issues are not substantially taught, suggested or disclosed in the above references.

SUMMARY OF THE INVENTION

It is therefore a primary object of the present invention to provide a protection sheath structure for switch wire connection device provides dustproof and waterproof effects and enhances the assembling security between the switch wire connection device and the conductive wire. The protection sheath has the form of a cylindrical body including a head section having a mouth section, a belly section connected with the head section and a tail section connected with the belly section. The head section and the belly section together define a chamber for assembling with the switch wire connection device. The tail section defines a guide hole permitting the conductive wire to plug into the protection sheath. Multiple annular ribs are disposed on a circumference of the tail section to enhance the structural strength of the protection sheath (or the tail section), whereby the tail section is able to bear external force produced in wiring operation of the conductive wire.

In the above protection sheath structure for switch wire connection device, a recessed section is formed around the head section to reduce the thickness of the head section and enhance the elasticity of the head section. Accordingly, the protection sheath (or the mouth section) can be easily assembled with the switch wire connection device to securely enclose the same.

In the above protection sheath structure for switch wire connection device, the chamber is formed with at least one shoulder section to help in locating the switch wire connection device.

The present invention can be best understood through the following description and accompanying drawings, wherein:

DETAILED DESCRIPTION OF THE PREFERRED EMBODIMENTS

Figure 1:
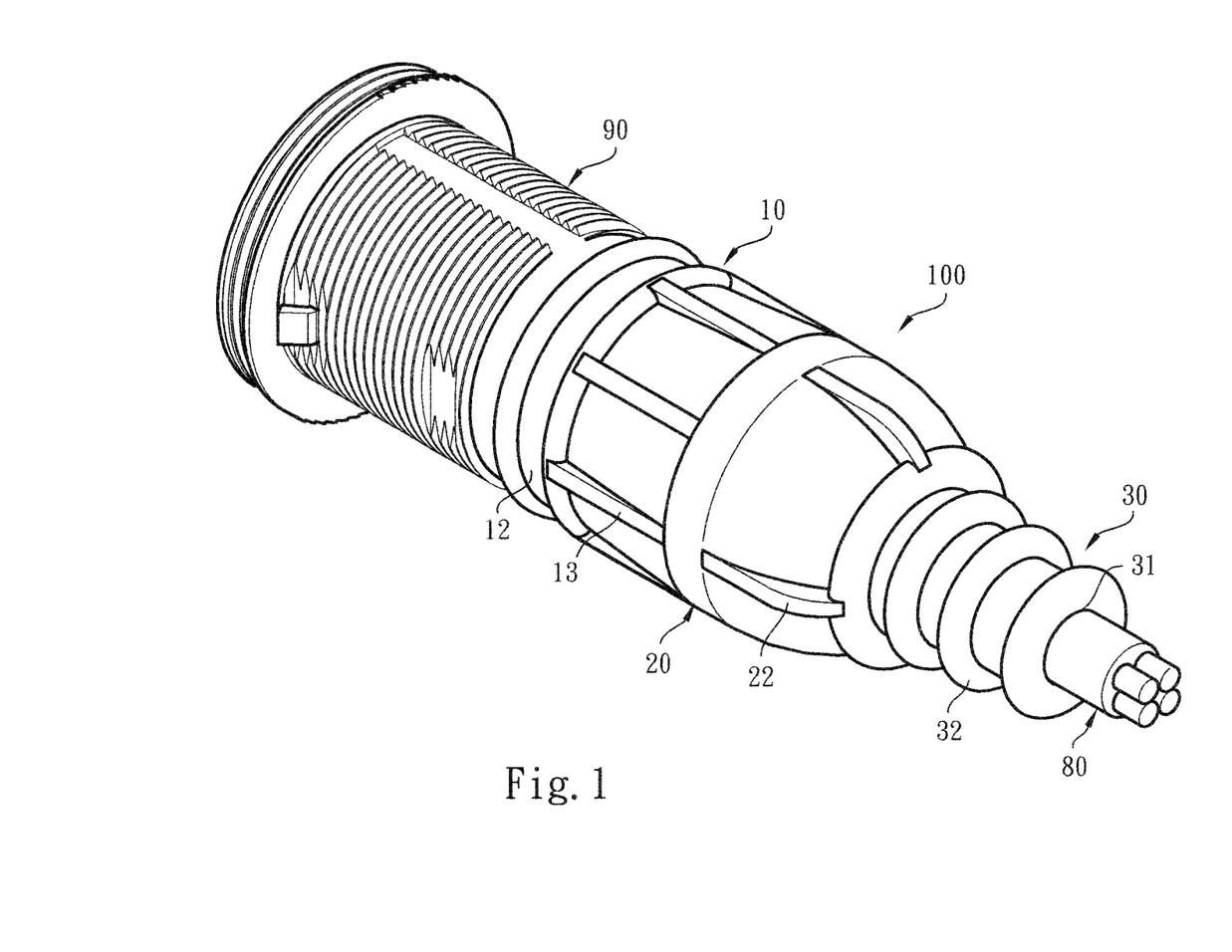
FIG. 1 is a perspective view of the protection sheath of the present invention, showing that the protection sheath is assembled with the switch wire connection device.
Figure 2:
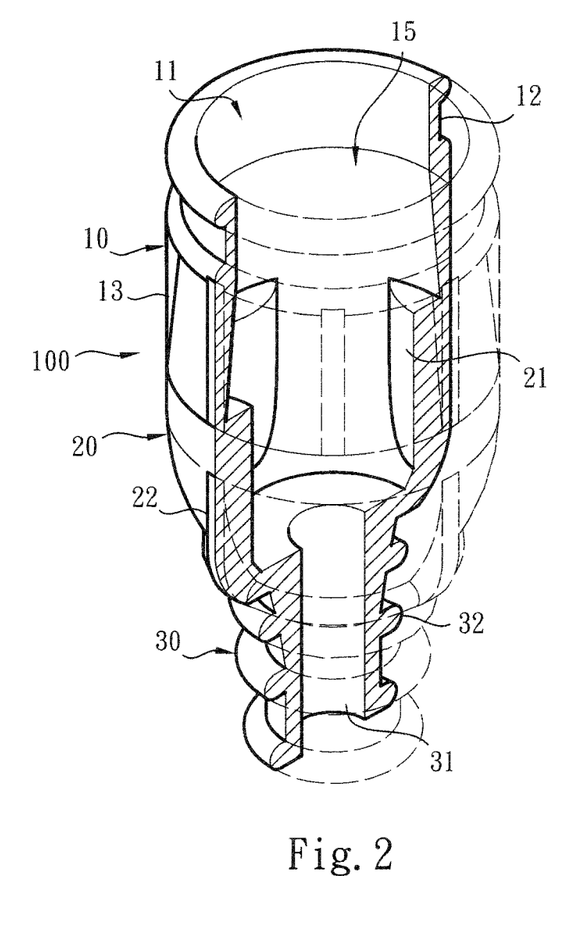
FIG. 2 is a perspective sectional view of the protection sheath of the present invention, showing the structures of the chamber and the guide hole of the protection sheath.
Figure 3:
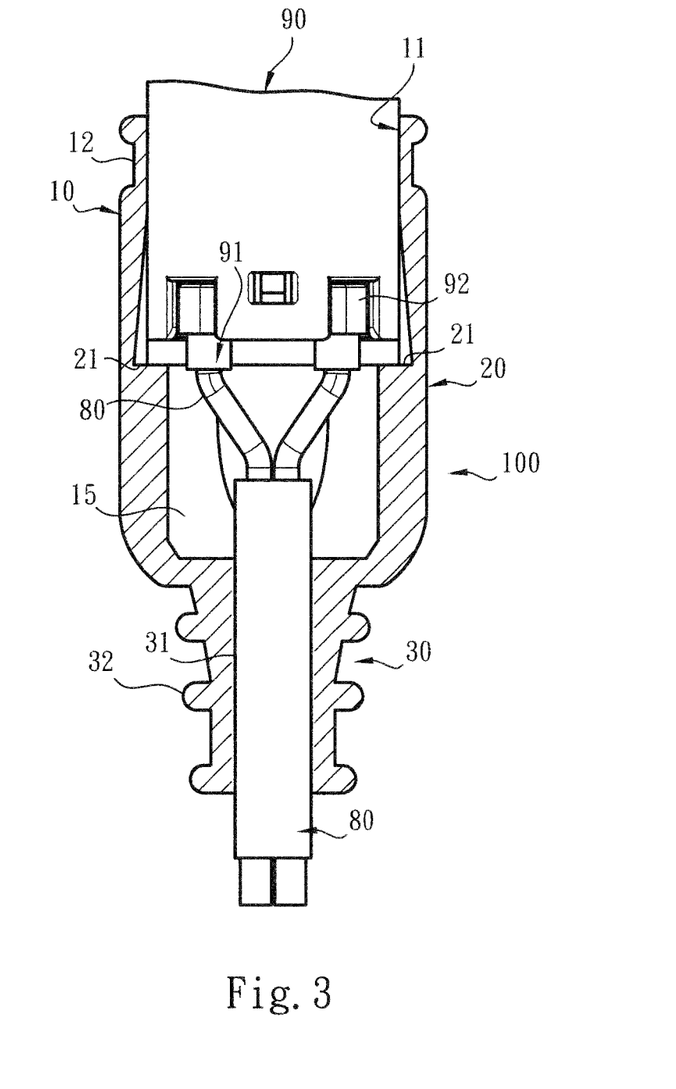
FIG. 3 is a sectional view according to FIG. 1, showing the assembly of the switch wire connection device and the protection sheath.

Please refer to FIGS. 1, 2 and 3. The protection sheath structure for switch wire connection device of the present invention includes a protection sheath 100 in the form of a cylindrical body. The protection sheath 100 is made of rubber, plastic or the like material for mounting or fitting on the switch wire connection device 90. The switch wire connection device 90 includes a wire plug-in hole 91 and a wire connection assembly 92 for pivotally connecting with a conductive wire 80. The switch wire connection device 90 pertains to prior art and thus will not be further described hereinafter.

In this embodiment, the protection sheath 100 includes a head section 10, a belly section 20 connected with the head section 10 and a tail section 30 connected with the belly section 20. The head section 10 defines a mouth section 11 and a recessed section 12 is formed around the head section 10 to reduce the thickness of the head section 10 and enhance the elasticity of the head section 10. Accordingly, the protection sheath 100 (or the mouth section 11) can be easily assembled with the switch wire connection device 90 to securely enclose the same.

As shown in the drawings, the head section 10 and the belly section 20 together define a chamber 15 in communication with the mouth section 11 for assembling with and receiving the switch wire connection device 90. The chamber 15 is formed with at least one shoulder section 21 to help in locating the switch wire connection device 90 as shown in FIG. 3.

As shown in FIGS. 1, 2 and 3, the tail section 30 defines a guide hole 31 in communication with the chamber 15. An operator can insert the conductive wire 80 into the guide hole 31, whereby the conductive wire 80 can enter the protection sheath 100 (or the chamber 15) to electrically connect with the switch wire connection device 90. In a preferred embodiment, multiple annular ribs 32 are disposed on a circumference of the tail section 30 to enhance the structural strength of the protection sheath 100 (or the tail section 30), whereby the tail section 30 is able to bear the external force produced in wiring operation of the conductive wire 80.

As shown in the drawings, multiple rib sections 13, 22 are respectively disposed on a circumference of the head section 10 and a circumference of the belly section 20 to enhance the structural strength of the protection sheath 100.

Figure 4:
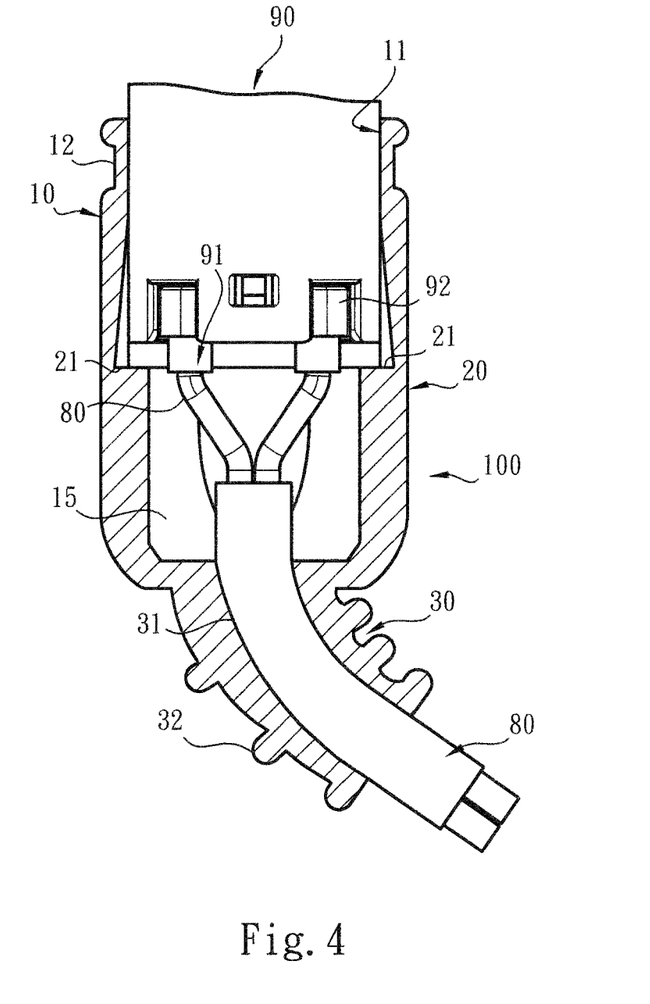
FIG. 4 is a sectional view of the protection sheath of the present invention, showing that when an operator pulls and bends the conductive wire, the tail section bears the external pulling and bending force.

Please now refer to FIG. 4. In wiring operation, when an operator pulls and bends the conductive wire 80, the tail section 30 and the annular ribs 32 are able to bear the external pulling and bending force (or action force) applied to the conductive wire 80. This lowers the possibility of damage of the protection sheath 100 due to external pulling and bending force.

It should be noted that FIG. 4 shows that the right side of the tail section 30 is compressed. Accordingly, in wiring operation of the conductive wire 80, when the tail section 30 is bent to a maximum extent, the annular ribs 32 also serve to stop or interfere with each other so as to prevent the protection sheath 100 (and/or the tail section 30 and the conductive wire 80) from being over-bent and damaged. Correspondingly, this can effectively avoid or minimize the possibility of damage of the conductive wire 80 so that the electrical connection will not be affected to cause danger.

Figure 5:
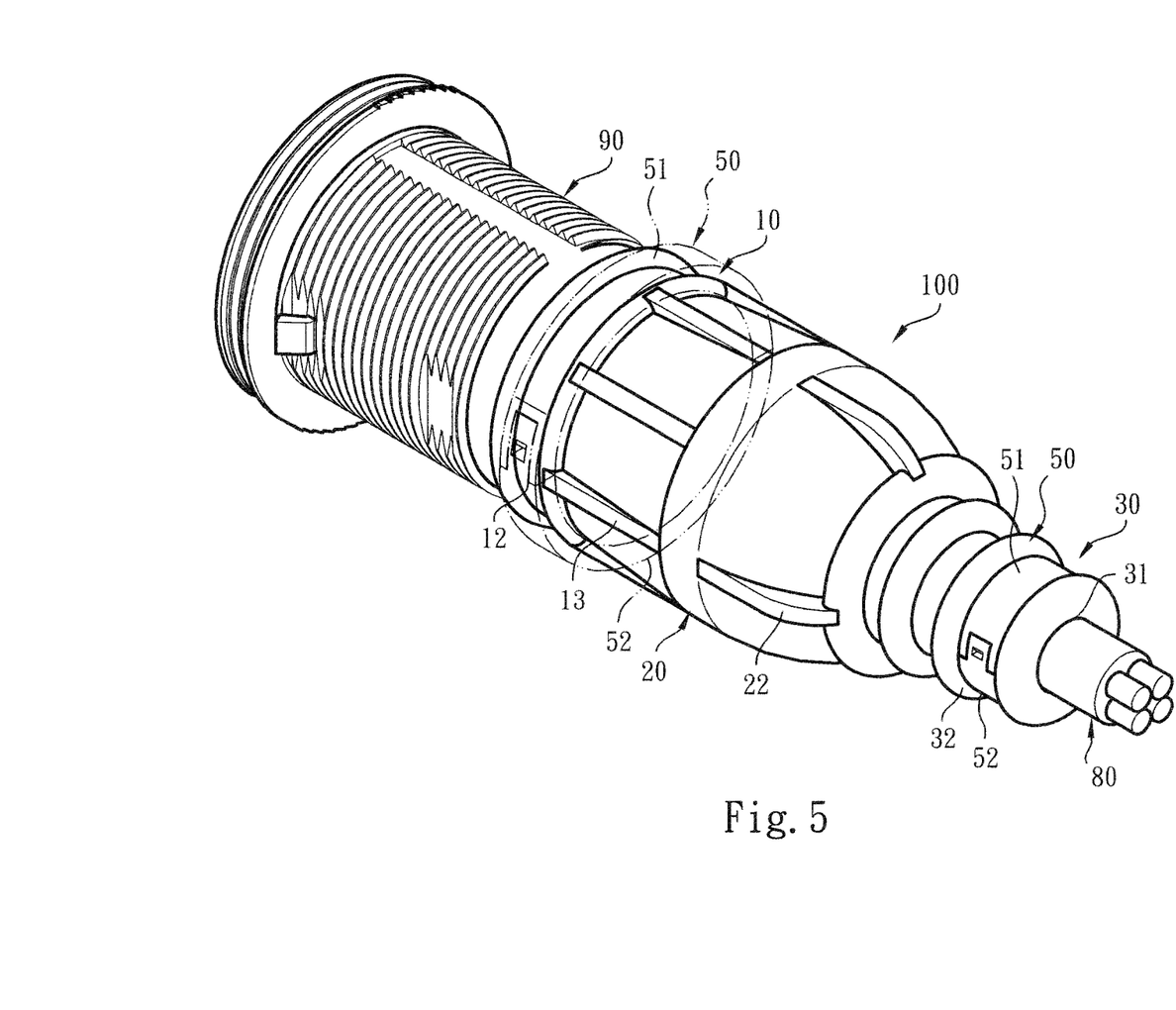
FIG. 5 is a perspective view of a modified embodiment of the present invention, showing that the protection sheath is equipped and assembled with a fixing unit, in which the phantom lines show the fixing unit assembled with the head section.
Figure 6:
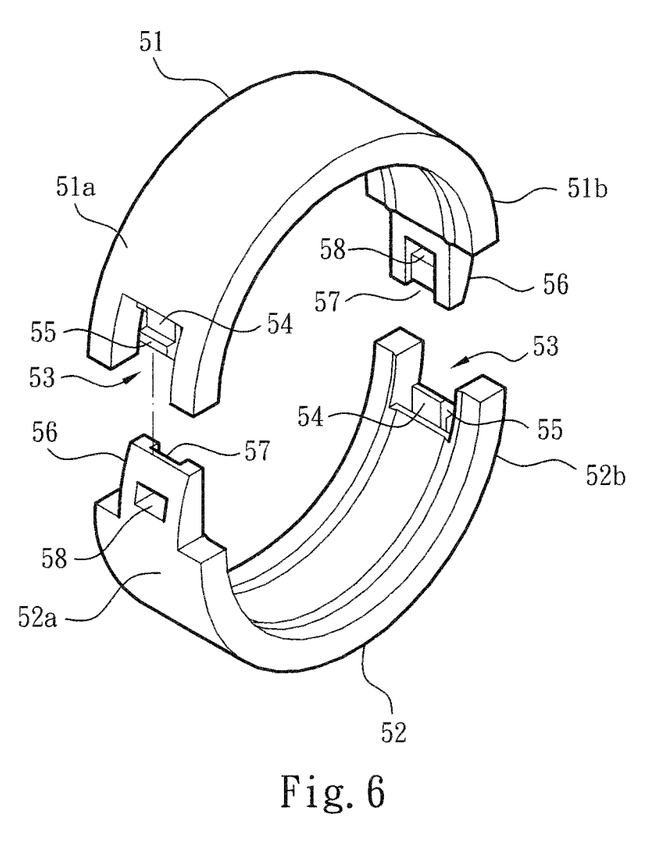
FIG. 6 is a perspective view of the fixing unit of the present invention.

Please now refer to FIGS. 5 and 6. In a modified embodiment, the protection sheath 100 is equipped with a fixing unit 50 to bind the head section 10 and/or the tail section 30. Accordingly, the protection sheath 100 and the switch wire connection device 90 (or the conductive wire 80) can be more securely and tightly connected with each other.

As shown in the drawings, the fixing unit 50 includes two semicircular structures with symmetry or corresponding to each other. The two semicircular structures are respectively defined as a first part 51 and a second part 52. Each of the first and second parts 51, 52 has a first end 51a, 52a and a second end 51b, 52b. The first end 51a of the first part 51 and the second end 52b of the second part 52 are formed with a notch section 53, a cantilever 54 positioned in the notch section 53 and a finger section 55 protruding from the cantilever 54. The second end 51b of the first part 51 and the first end 52a of the second part 52 are formed with a hand section 56, a channel section 57 formed on the hand section 56 and an insertion socket 58 connected with the channel 57.

In this embodiment, the first and second parts 51, 52 can be connected or inserted with each other. The notch section 53 of the first end 51a of the first part 51 is assembled with the hand section 56 of the first end 52a of the second part 52. Accordingly, the cantilever 54 and the finger section 55 of the first end 51a of the first part 51 are correspondingly assembled or inserted in the channel section 57 and the insertion socket 58 of the first end 52a of the second part 52.

Also, the hand section 56, channel section 57 and insertion socket 58 of the second end 51*b* of the first part 51 are correspondingly assembled or inserted with the notch section 53, the cantilever 54 and the finger section 55 of the second end 52*b* of the second part 52. Therefore, the head section 10 and/or the tail section 30 are securely bound with the fixing unit 50.

Figure 7:
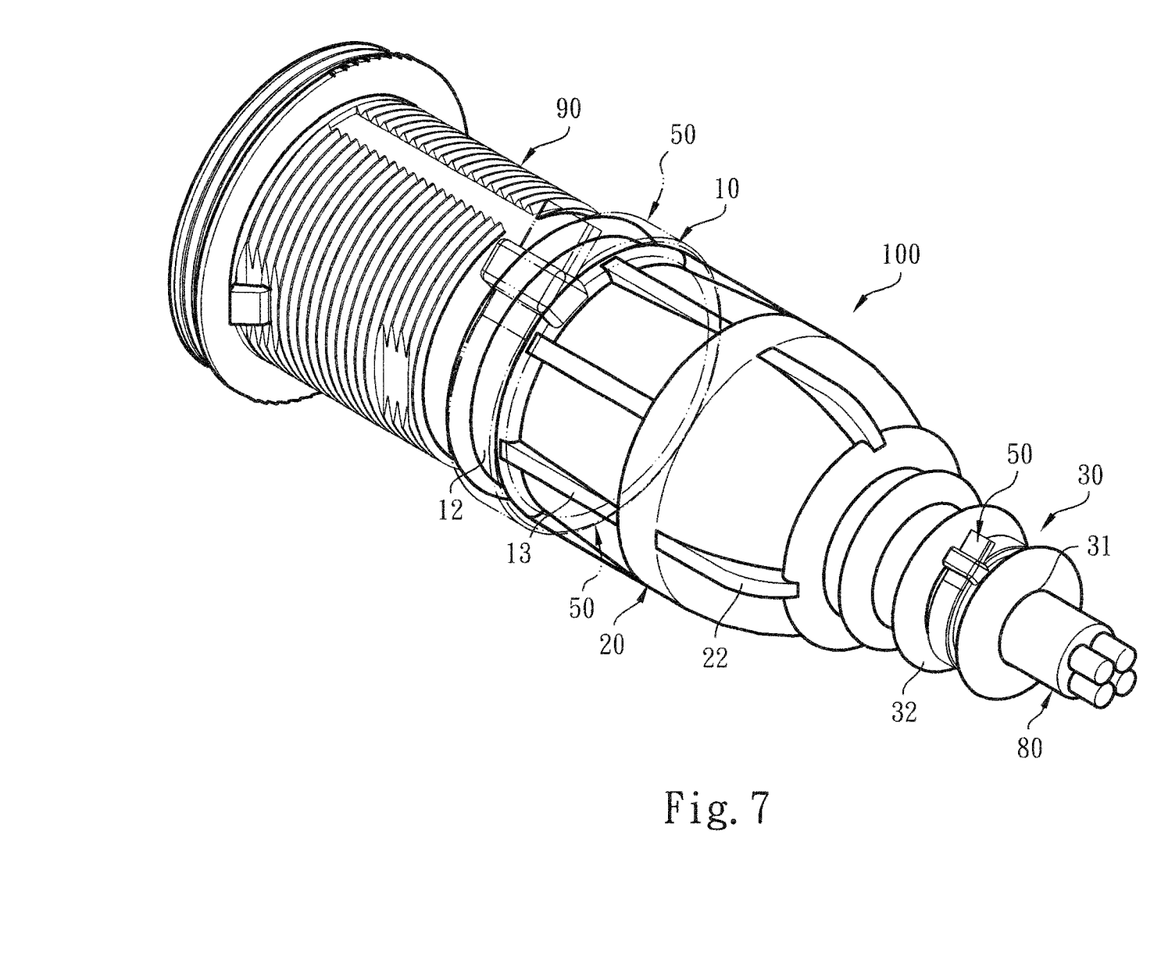
FIG. 7 is a perspective view of a modified embodiment of the protection sheath of the present invention, showing that the protection sheath is equipped and assembled with a fixing unit, in which the phantom lines show the fixing unit assembled with the head section.

FIG. 7 shows a modified embodiment of the present invention, in which the fixing unit 50 has the form of a fastening strap. The fixing unit 50 in the form of the fastening strap is securely assembled with the head section 10 as shown by phantom lines of FIG. 7.

Figure 8:
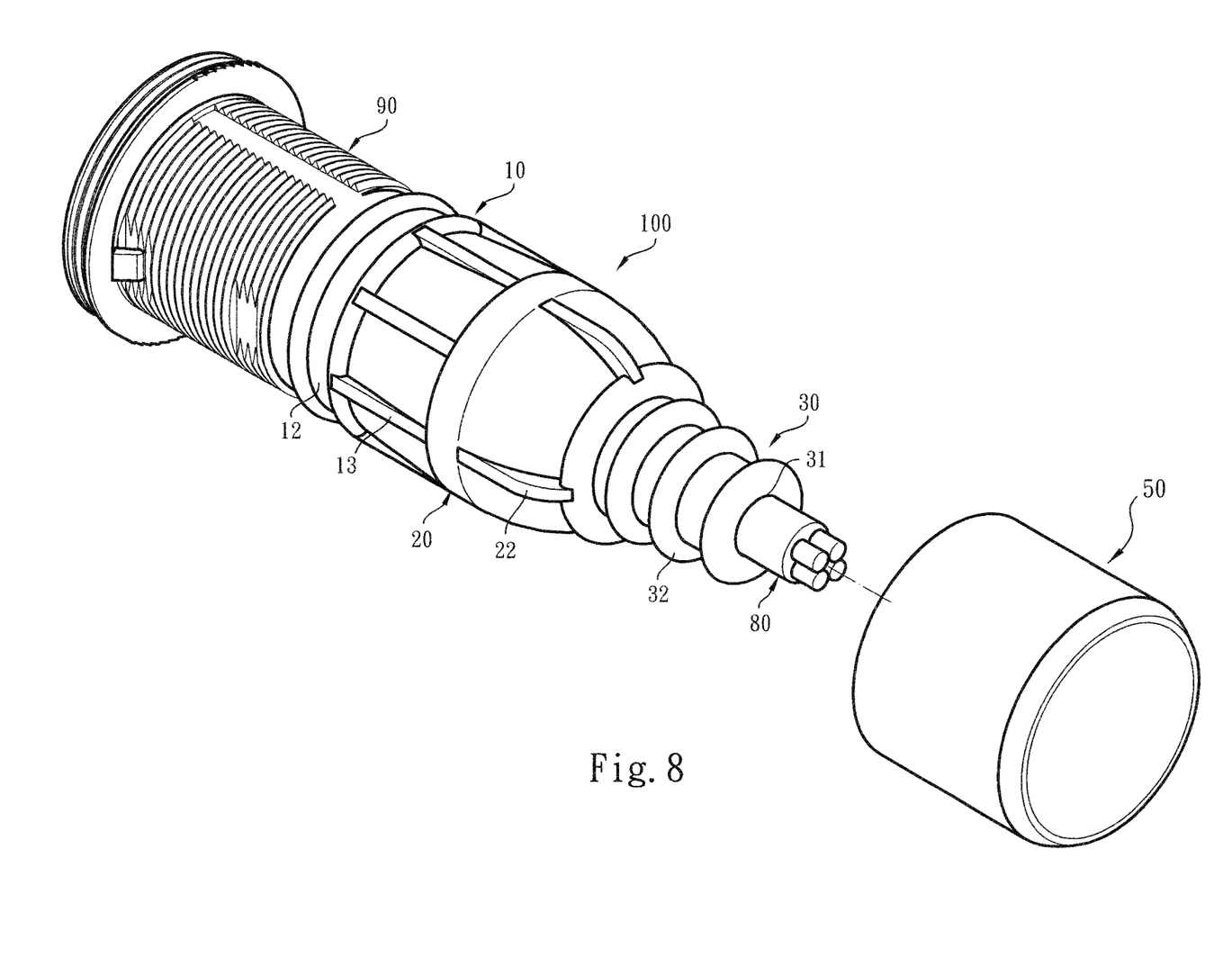
FIG. 8 is a perspective view of a preferred embodiment of the protection sheath of the present invention, showing that the protection sheath is equipped and assembled with a fixing unit.
Figure 9:
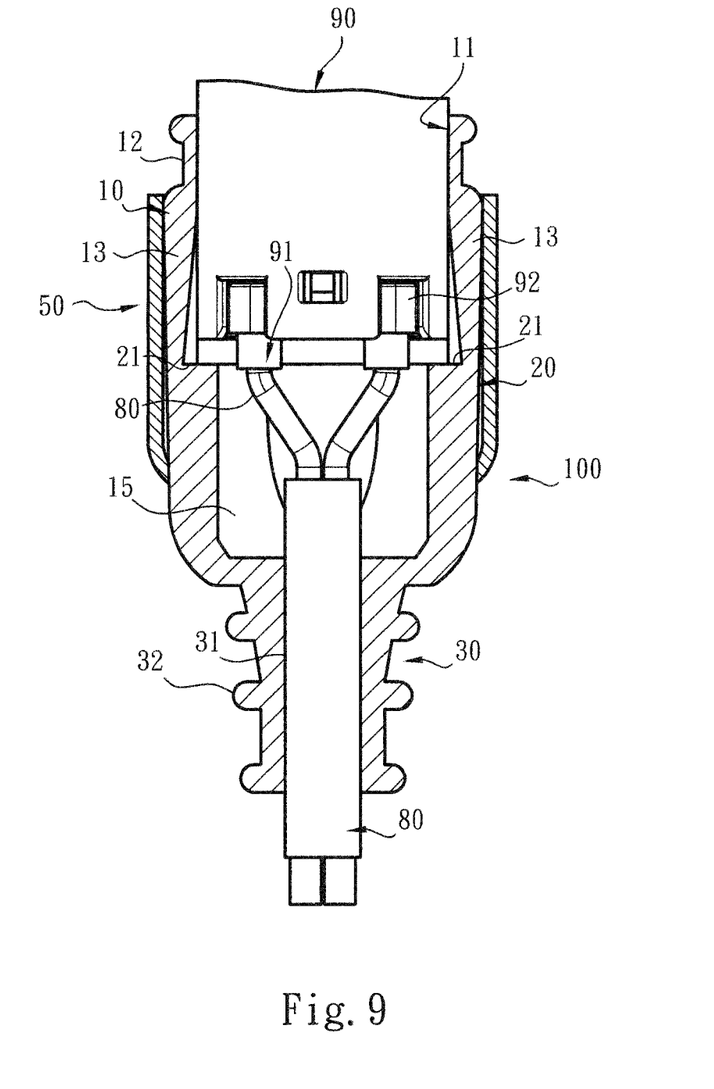
FIG. 9 is a plane sectional view according to FIG. 9, showing that the fixing unit and the protection sheath are cooperatively assembled with each other.

Please now refer to FIGS. 8 and 9. In a preferred embodiment, the fixing unit 50 is a cylindrical body. When the fixing unit 50 is assembled with the protection sheath 100, the fixing unit 50 gradually interferes with the rib sections 13. Accordingly, the fixing unit 50 is securely fitted on the protection sheath 100 to forcedly make the protection sheath 100 more securely and tightly connected with the switch wire connection device 90.

It should be noted that the rib sections 13 can be formed with a gradually obliquely diverging structure, whereby the interference and assembling force between the fixing unit 50 and the rib sections 13 is gradually increased.

Figure 10:
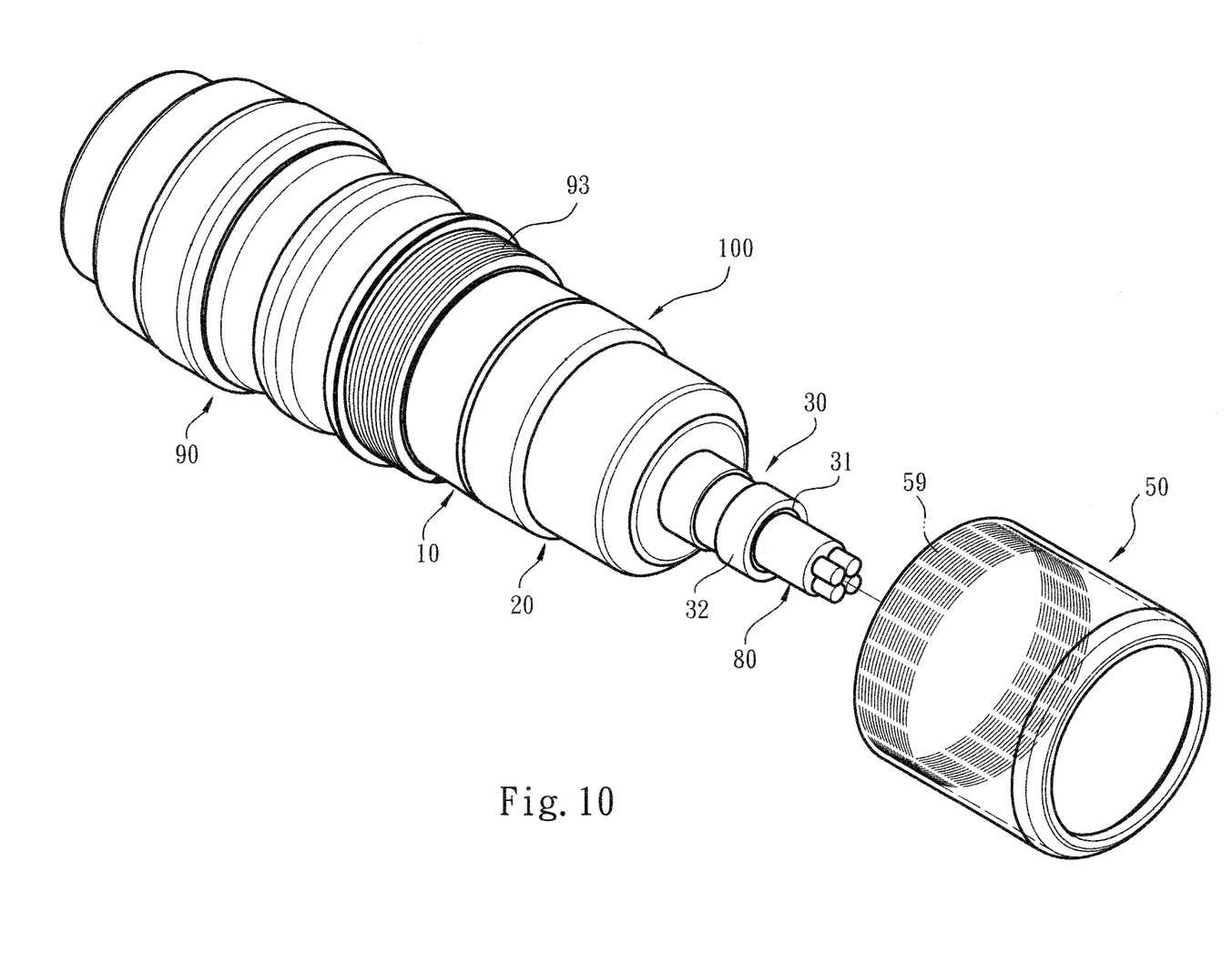
FIG. 10 is a perspective view of a modified embodiment of the protection sheath of the present invention, showing the cooperative structures of the switch wire connection device, the protection sheath and the fixing unit assembled therewith.

Please refer to FIG. 10, which shows a modified embodiment. As shown in the drawing, the fixing unit 50 is a cylindrical body. An inner wall of the fixing unit 50 is formed with a threaded section 59. The switch wire connection device 90 is formed with a threaded section 93 corresponding to the threaded section 59 of the fixing unit 50. Accordingly, the fixing unit 50 can be locked with the switch wire connection device 90, whereby the protection sheath 100 is forced to more securely and tightly connect with the switch wire connection device 90.

Figure 11:
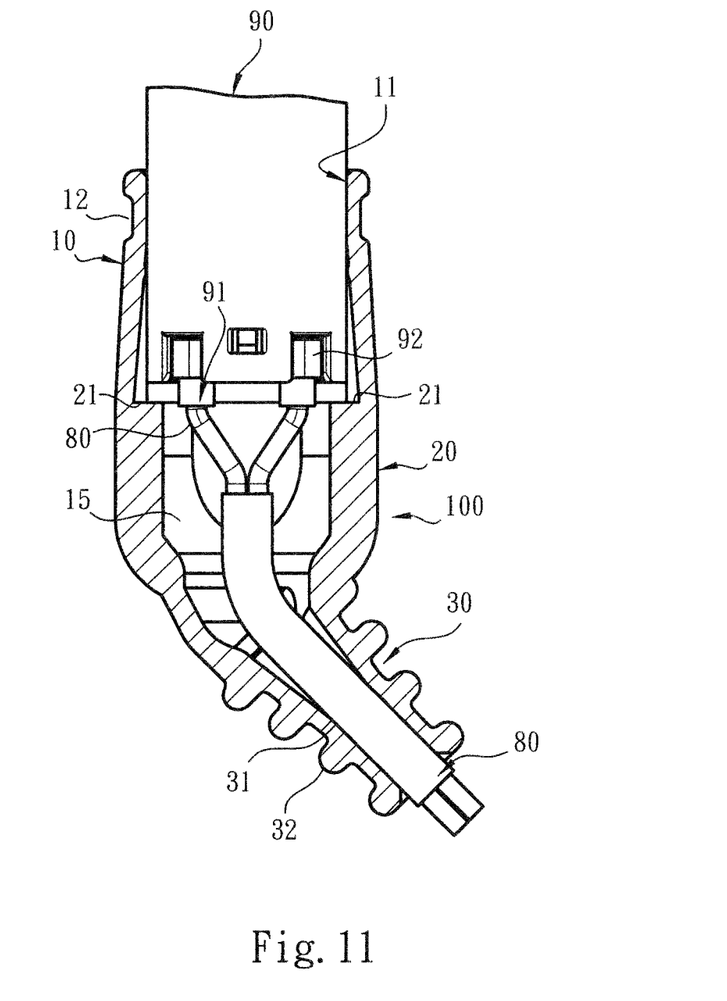
FIG. 11 is a plane sectional view of a preferred embodiment of the protection sheath of the present invention, showing that the tail section obliquely extends relative to the axis of the protection sheath.

FIG. 11 shows a preferred embodiment, in which the tail section 30 is an obliquely extending structure relative to the axis of the protection sheath 100. The angle contained between the tail section 30 and the axis of the protection sheath 100 ranges from about 15 degrees to about 75 degrees.

Figure 12:
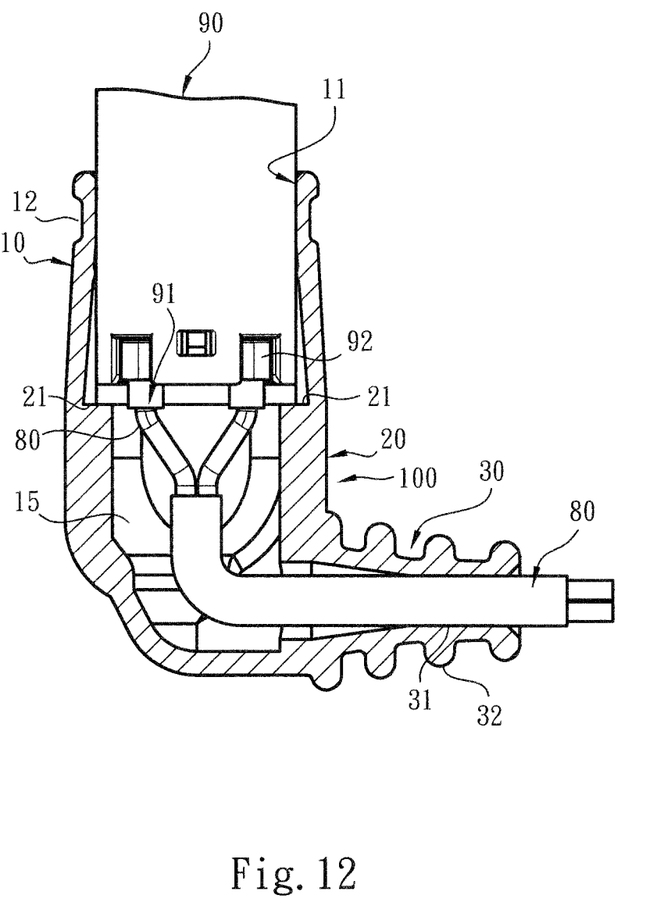
FIG. 12 is a plane sectional view of a modified embodiment of the protection sheath of the present invention, showing that the tail section is perpendicularly bent from the axis of the protection sheath.

FIG. 12 shows a modified embodiment, in which the tail section 30 is perpendicularly bent from the axis of the protection sheath 100.

Figure 13:
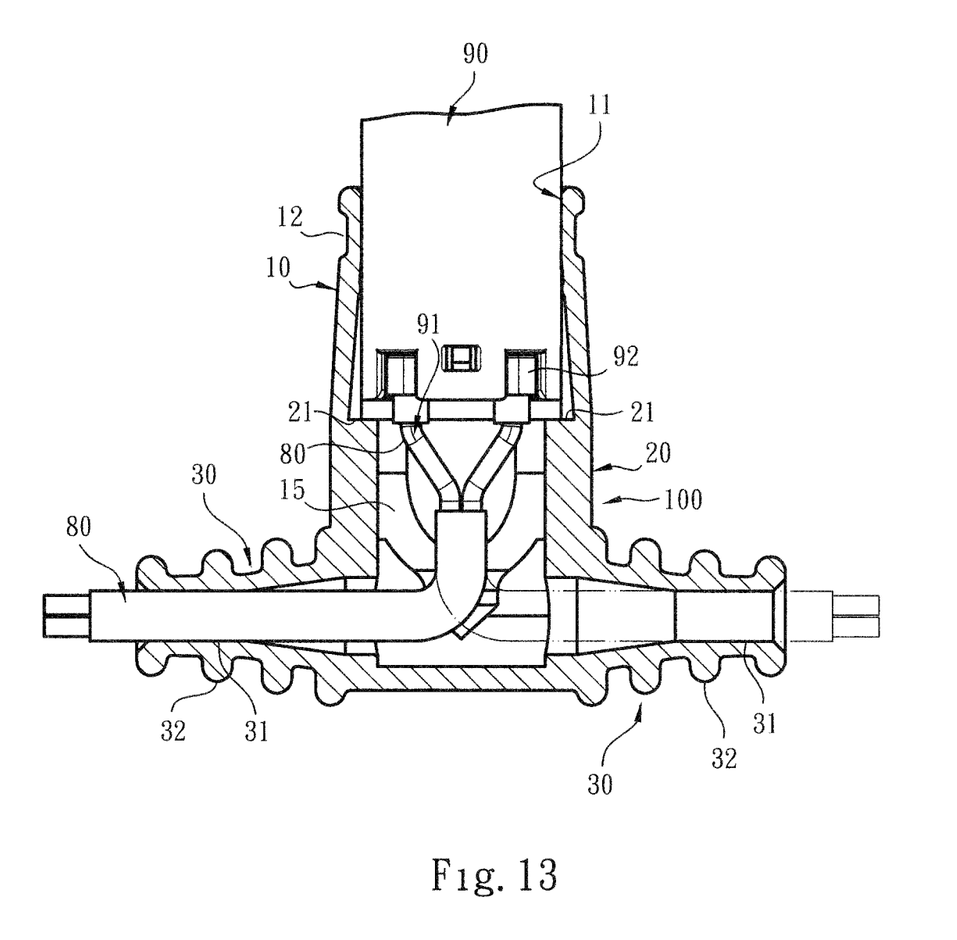
FIG. 13 is a plane sectional view of a modified embodiment of the protection sheath of the present invention, showing that the tail section respectively extends to two sides relative to the axis of the protection sheath, whereby the tail section is perpendicularly bent from the axis of the protection sheath.

FIG. 13 shows a modified embodiment, in which the tail section 30 respectively extends to two sides (of the drawing) relative to the axis of the protection sheath 100, whereby the tail section 30 is perpendicularly bent from the axis of the protection sheath 100.

It should be noted that the structure and the arrangement direction of the tail section 30 as shown in FIGS. 11, 12 and 13 are determined by the actual use requirement, whereby the conductive wire 80 can be more easily connected with the switch wire connection device 90.

To speak representatively, in comparison with the conventional switch wire connection device, the protection sheath structure for switch wire connection device of the present invention has the following advantages:

1. The structures of the protection sheath 100 and the relevant cooperative components have been redesigned. For example, the protection sheath 100 includes a head section 10, a belly section 20 and a tail section 30. The head section 10 defines a mouth section 11 and a recessed section 12. The head section 10 and the belly section 20 together define a chamber 15. The tail section 30 is formed with a guide hole 31 and multiple annular ribs 32. The protection sheath 100 is assembled with the fixing unit 50. The assembling relationship of the conventional switch wire connection device is changed so that the protection sheath 100 is obviously different from the conventional switch wire connection device in use and operation form.

2. In condition that an operator can conveniently operate and assemble the switch wire connection device 90, the protection sheath structure 100 and/or the fixing unit 50 assembled therewith are able to prevent dust, water or moisture from infiltrating and accumulating in the switch wire connection device. Also, the protection sheath can be more securely and tightly connected with the switch wire connection device 90. Moreover, the additional case for enclosing the switch can be omitted. Therefore, the problems of the conventional switch wire connection device that the occupied room of the entire switch device is increased, the operation and delivery are more troublesome and the cost is increased are apparently improved.

Especially, the protection sheath structure 100 has sufficient structural strength to bear the external pulling and bending force (or action force) applied to the switch wire connection device 90 when an operator operates or wires the switch wire connection device 90.

In conclusion, the protection sheath structure for switch wire connection device of the present invention is effective and different from the conventional switch wire connection device in space form. The protection sheath structure for switch wire connection device of the present invention is inventive and greatly advanced and advantageous over the conventional switch wire connection device.

The above embodiments are only used to illustrate the present invention, not intended to limit the scope thereof. Many modifications of the above embodiments can be made without departing from the spirit of the present invention.

What is claimed is:

1. A protection sheath structure for switch wire connection device, comprising a protection sheath in the form of a cylindrical body, the protection sheath including a head section having a mouth section, a belly section connected with the head section, and at least one tail section connected with the belly section, the head section and the belly section together defining a chamber in communication with the mouth section for receiving a connection device through the mouth section, the tail section having a tubular portion defining a guide hole in communication with the chamber, the tubular portion being shaped to coaxially receive in conformed manner a conductive wire inserted through the guide hole for guiding the conductive wire into opposed alignment with the connection device inside the chamber, a plurality of annular ribs being disposed on a circumference of the tail section to enhance the structural strength of the tail section, whereby the tail section is able to bear external force produced in a wiring operation.

2. The protection sheath structure for switch wire connection device as claimed in claim 1, wherein the protection sheath is made of rubber or plastic material for assembling with the switch wire connection device, the guide hole of the tail section permitting the conductive wire to plug into the protection sheath.

3. The protection sheath structure for switch wire connection device as claimed in claim 1, wherein a recessed section is formed on a surface of the head section.

4. The protection sheath structure for switch wire connection device as claimed in claim 2, wherein a recessed section is formed on a surface of the head section.

5. The protection sheath structure for switch wire connection device as claimed in claim 1, wherein the chamber is formed with at least one shoulder section.

6. The protection sheath structure for switch wire connection device as claimed in claim 2, wherein the chamber is formed with at least one shoulder section.

7. The protection sheath structure for switch wire connection device as claimed in claim 3, wherein the chamber is formed with at least one shoulder section.

8. The protection sheath structure for switch wire connection device as claimed in claim 4, wherein the chamber is formed with at least one shoulder section.

9. The protection sheath structure for switch wire connection device as claimed in claim 1, wherein a plurality of first rib sections are disposed on a circumference of the head section and a plurality of second rib sections are disposed on a circumference of the belly section.

10. The protection sheath structure for switch wire connection device as claimed in claim 2, wherein a plurality of first rib sections are disposed on a circumference of the head section and a plurality of second rib sections are disposed on a circumference of the belly section.

11. The protection sheath structure for switch wire connection device as claimed in claim 3, wherein a plurality of first rib sections are disposed on a circumference of the head section and a plurality of second rib sections are disposed on a circumference of the belly section.

12. The protection sheath structure for switch wire connection device as claimed in claim 4, wherein a plurality of first rib sections are disposed on a circumference of the head section and a plurality of second rib sections are disposed on a circumference of the belly section.

13. The protection sheath structure for switch wire connection device as claimed in claim 1, wherein the annular ribs interfere with each other to prevent bending of the tail section beyond a maximum extent.

14. The protection sheath structure for switch wire connection device as claimed in claim 2, wherein the annular ribs interfere with each other to prevent bending of the tail section beyond a maximum extent.

15. The protection sheath structure for switch wire connection device as claimed in claim 2, wherein the protection sheath is equipped and assembled with a fixing unit for binding at least one of the head section and the tail section, the fixing unit including two semicircular structures with symmetry, the two semicircular structures being respectively defined as a first part and a second part, each of the first and second parts having a first end and a second end, the first end of the first part and the second end of the second part being formed with a notch section, a cantilever positioned in the notch section and a finger section protruding from the cantilever, the second end of the first part and the first end of the second part being formed with a hand section, a channel section formed on the hand section and an insertion socket connected with the channel section, whereby the first and second parts can be assembled with each other, the notch section of the first end of the first part being assembled with the hand section of the first end of the second part, whereby the cantilever and the finger section of the first end of the first part are correspondingly assembled in the channel section and the insertion socket of the first end of the second part, the hand section, channel section and insertion socket of the second end of the first part being correspondingly assembled with the notch section, the cantilever and the finger section of the second end of the second part.

16. The protection sheath structure for switch wire connection device as claimed in claim 3, wherein the protection sheath is equipped and assembled with a fixing unit for binding at least one of the head section and the tail section, the fixing unit including two semicircular structures with symmetry, the two semicircular structures being respectively defined as a first part and a second part, each of the first and second parts having a first end and a second end, the first end of the first part and the second end of the second part being formed with a notch section, a cantilever positioned in the notch section and a finger section protruding from the cantilever, the second end of the first part and the first end of the second part being formed with a hand section, a channel section formed on the hand section and an insertion socket connected with the channel section, whereby the first and second parts can be assembled with each other, the notch section of the first end of the first part being assembled with the hand section of the first end of the second part, whereby the cantilever and the finger section of the first end of the first part are correspondingly assembled in the channel section and the insertion socket of the first end of the second part, the hand section, channel section and insertion socket of the second end of the first part being correspondingly assembled with the notch section, the cantilever and the finger section of the second end of the second part.

17. The protection sheath structure for switch wire connection device as claimed in claim 4, wherein the protection sheath is equipped and assembled with a fixing unit for binding at least one of the head section and the tail section, the fixing unit including two semicircular structures with symmetry, the two semicircular structures being respectively defined as a first part and a second part, each of the first and second parts having a first end and a second end, the first end of the first part and the second end of the second part being formed with a notch section, a cantilever positioned in the notch section and a finger section protruding from the cantilever, the second end of the first part and the first end of the second part being formed with a hand section, a channel section formed on the hand section and an insertion socket connected with the channel section, whereby the first and second parts can be assembled with each other, the notch section of the first end of the first part being assembled with the hand section of the first end of the second part, whereby the cantilever and the finger section of the first end of the first part are correspondingly assembled in the channel section and the insertion socket of the first end of the second part, the hand section, channel section and insertion socket of the second end of the first part being correspondingly assembled with the notch section, the cantilever and the finger section of the second end of the second part.

18. The protection sheath structure for switch wire connection device as claimed in claim 9, wherein the protection sheath is equipped and assembled with a fixing unit for binding at least one of the head section and the tail section, the fixing unit including two semicircular structures with symmetry, the two semicircular structures being respectively defined as a first part and a second part, each of the first and second parts having a first end and a second end, the first end of the first part and the second end of the second part being formed with a notch section, a cantilever positioned in the notch section and a finger section protruding from the cantilever, the second end of the first part and the first end of the second part being formed with a hand section, a channel section formed on the hand section and an insertion socket connected with the channel section, whereby the first and second parts can be assembled with each other, the notch section of the first end of the first part being assembled with the hand section of the first end of the second part, whereby the cantilever and the finger section of the first end of the first part are correspondingly assembled in the channel section and the insertion socket of the first end of the second part, the hand section, channel section and insertion socket of the second end of the first part being correspondingly assembled with the notch section, the cantilever and the finger section of the second end of the second part.

19. The protection sheath structure for switch wire connection device as claimed in claim 10, wherein the protection sheath is equipped and assembled with a fixing unit for binding at least one of the head section and the tail section, the fixing unit including two semicircular structures with symmetry, the two semicircular structures being respectively defined as a first part and a second part, each of the first and second parts having a first end and a second end, the first end of the first part and the second end of the second part being formed with a notch section, a cantilever positioned in the notch section and a finger section protruding from the cantilever, the second end of the first part and the first end of the second part being formed with a hand section, a channel section formed on the hand section and an insertion socket connected with the channel section, whereby the first and second parts can be assembled with each other, the notch section of the first end of the first part being assembled with the hand section of the first end of the second part, whereby the cantilever and the finger section of the first end of the first part are correspondingly assembled in the channel section and the insertion socket of the first end of the second part, the hand section, channel section and insertion socket of the second end of the first part being correspondingly assembled with the notch section, the cantilever and the finger section of the second end of the second part.

20. The protection sheath structure for switch wire connection device as claimed in claim 16, wherein the protection sheath is equipped and assembled with a fixing unit for binding at least one of the head section and the tail section, the fixing unit including two semicircular structures with symmetry, the two semicircular structures being respectively defined as a first part and a second part, each of the first and second parts having a first end and a second end, the first end of the first part and the second end of the second part being formed with a notch section, a cantilever positioned in the notch section and a finger section protruding from the cantilever, the second end of the first part and the first end of the second part being formed with a hand section, a channel section formed on the hand section and an insertion socket connected with the channel section, whereby the first and second parts can be assembled with each other, the notch section of the first end of the first part being assembled with the hand section of the first end of the second part, whereby the cantilever and the finger section of the first end of the first part are correspondingly assembled in the channel section and the insertion socket of the first end of the second part, the hand section, channel section and insertion socket of the second end of the first part being correspondingly assembled with the notch section, the cantilever and the finger section of the second end of the second part.

21. The protection sheath structure for switch wire connection device as claimed in claim 17, wherein the protection sheath is equipped and assembled with a fixing unit for binding at least one of the head section and the tail section, the fixing unit including two semicircular structures with symmetry, the two semicircular structures being respectively defined as a first part and a second part, each of the first and second parts having a first end and a second end, the first end of the first part and the second end of the second part being formed with a notch section, a cantilever positioned in the notch section and a finger section protruding from the cantilever, the second end of the first part and the first end of the second part being formed with a hand section, a channel section formed on the hand section and an insertion socket connected with the channel section, whereby the first and second parts can be assembled with each other, the notch section of the first end of the first part being assembled with the hand section of the first end of the second part, whereby the cantilever and the finger section of the first end of the first part are correspondingly assembled in the channel section and the insertion socket of the first end of the second part, the hand section, channel section and insertion socket of the second end of the first part being correspondingly assembled with the notch section, the cantilever and the finger section of the second end of the second part.

22. The protection sheath structure for switch wire connection device as claimed in claim 1, wherein the protection sheath is equipped and assembled with a fixing unit, the fixing unit having the form of a fastening strap for encircling and binding at least one of the head section and the tail section.

23. The protection sheath structure for switch wire connection device as claimed in claim 2, wherein the protection sheath is equipped and assembled with a fixing unit, the fixing unit having the form of a fastening strap for encircling and binding at least one of the head section and the tail section.

24. The protection sheath structure for switch wire connection device as claimed in claim 3, wherein the protection sheath is equipped and assembled with a fixing unit, the fixing unit having the form of a fastening strap for encircling and binding at least one of the head section and the tail section.

25. The protection sheath structure for switch wire connection device as claimed in claim 4, wherein the protection sheath is equipped and assembled with a fixing unit, the fixing unit having the form of a fastening strap for encircling and binding at least one of the head section and the tail section.

26. The protection sheath structure for switch wire connection device as claimed in claim 1, wherein the protection sheath is equipped and assembled with a fixing unit, the fixing unit being a cylindrical body.

27. The protection sheath structure for switch wire connection device as claimed in claim 2, wherein the protection sheath is equipped and assembled with a fixing unit, the fixing unit being a cylindrical body.

28. The protection sheath structure for switch wire connection device as claimed in claim 3, wherein the protection sheath is equipped and assembled with a fixing unit, the fixing unit being a cylindrical body.

29. The protection sheath structure for switch wire connection device as claimed in claim 4, wherein the protection sheath is equipped and assembled with a fixing unit, the fixing unit being a cylindrical body.

30. The protection sheath structure for switch wire connection device as claimed in claim 2, wherein the protection sheath is equipped and assembled with a fixing unit, the fixing unit being a cylindrical body, an inner wall of the fixing unit being formed with a threaded section, a switch wire connection device being formed with a threaded section corresponding to the threaded section of the fixing unit, the threaded section of the switch wire connection device being assembled with the threaded section of the fixing unit.

31. The protection sheath structure for switch wire connection device as claimed in claim 3, wherein the protection sheath is equipped and assembled with a fixing unit, the fixing unit being a cylindrical body, an inner wall of the fixing unit being formed with a threaded section, a switch wire connection device being formed with a threaded section corresponding to the threaded section of the fixing unit, the threaded section of the switch wire connection device being assembled with the threaded section of the fixing unit.

32. The protection sheath structure for switch wire connection device as claimed in claim 4, wherein the protection sheath is equipped and assembled with a fixing unit, the fixing unit being a cylindrical body, an inner wall of the fixing unit being formed with a threaded section, a switch wire connection device being formed with a threaded section corresponding to the threaded section of the fixing unit, the threaded section of the switch wire connection device being assembled with the threaded section of the fixing unit.

33. The protection sheath structure for switch wire connection device as claimed in claim 1, wherein the tail section obliquely extends relative to an axis of the head section or is perpendicularly bent from the axis of the head section, an angle contained between the tail section and the axis of the head section ranging from 15 degrees to 90 degrees.

34. The protection sheath structure for switch wire connection device as claimed in claim 2, wherein the tail section obliquely extends relative to an axis of the head section or is perpendicularly bent from the axis of the head section, an angle contained between the tail section and the axis of the head section ranging from 15 degrees to 90 degrees.

35. The protection sheath structure for switch wire connection device as claimed in claim 3, wherein the tail section obliquely extends relative to an axis of the head section or is perpendicularly bent from the axis of the head section, an angle contained between the tail section and the axis of the head section ranging from 15 degrees to 90 degrees.

36. The protection sheath structure for switch wire connection device as claimed in claim 4, wherein the tail section obliquely extends relative to an axis of the head section or is perpendicularly bent from the axis of the head section, an angle contained between the tail section and the axis of the head section ranging from 15 degrees to 90 degrees.

37. The protection sheath structure for switch wire connection device as claimed in claim 1, wherein the at least one tail section is a plurality of tail sections respectively extending to at least two opposing sides of the protection sheath relative to the axis of the head section, whereby the tail sections are perpendicularly bent from the axis of the head section.

38. The protection sheath structure for switch wire connection device as claimed in claim 2, wherein the at least one tail section is a plurality of tail sections respectively extending to at least two opposing sides of the protection sheath relative to the axis of the head section, whereby the tail sections are perpendicularly bent from the axis of the head section.

39. The protection sheath structure for switch wire connection device as claimed in claim 3, wherein the at least one tail section is a plurality of tail sections respectively extending to at least two opposing sides of the protection sheath relative to the axis of the head section, whereby the tail sections are perpendicularly bent from the axis of the head section.

40. The protection sheath structure for switch wire connection device as claimed in claim 4, wherein the at least one tail section is a plurality of tail sections respectively extending to at least two opposing sides of the protection sheath relative to the axis of the head section, whereby the tail sections are perpendicularly bent from the axis of the head section.

41. A protection sheath structure for switch wire connection device comprising a protection sheath in the form of a cylindrical body, the protection sheath including a head section having a mouth section, a belly section connected with the head section and at least one tail section connected with the belly section, the head section and the belly section together defining a chamber in communication with the mouth section, the tail section defining a guide hole in communication with the chamber, multiple annular ribs being disposed on a circumference of the tail section to enhance the structural strength of the protection sheath, whereby the tail section is able to bear external force produced in wiring operation, wherein the protection sheath is equipped and assembled with a fixing unit for binding at least one of the head section and the tail section, the fixing unit including two semicircular structures with symmetry, the two semicircular structures being respectively defined as a first part and a second part, each of the first and second parts having a first end and a second end, the first end of the first part and the second end of the second part being formed with a notch section, a cantilever positioned in the notch section and a finger section protruding from the cantilever, the second end of the first part and the first end of the second part being formed with a hand section, a channel section formed on the hand section and an insertion socket connected with the channel section, whereby the first and second parts can be assembled with each other, the notch section of the first end of the first part being assembled with the hand section of the first end of the second part, whereby the cantilever and the finger section of the first end of the first part are correspondingly assembled in the channel section and the insertion socket of the first end of the second part, the hand section, channel section and insertion socket of the second end of the first part being correspondingly assembled with the notch section, the cantilever and the finger section of the second end of the second part.

42. A protection sheath structure for switch wire connection device comprising a protection sheath in the form of a cylindrical body, the protection sheath including a head section having a mouth section, a belly section connected with the head section and at least one tail section connected with the belly section, the head section and the belly section together defining a chamber in communication with the mouth section, the tail section defining a guide hole in communication with the chamber, multiple annular ribs being disposed on a circumference of the tail section to enhance the structural strength of the protection sheath, whereby the tail section is able to bear external force produced in wiring operation, wherein the protection sheath is equipped and assembled with a fixing unit, the fixing unit being a cylindrical body, an inner wall of the fixing unit being formed with a threaded section, a switch wire connection device being formed with a threaded section corresponding to the threaded section of the fixing unit, the threaded section of the switch wire connection device being assembled with the threaded section of the fixing unit.

* * * * *